US008250582B2

(12) United States Patent
Agarwala et al.

(10) Patent No.: US 8,250,582 B2
(45) Date of Patent: Aug. 21, 2012

(54) CHARGEBACK REDUCTION PLANNING FOR INFORMATION TECHNOLOGY MANAGEMENT

(75) Inventors: Sandip Agarwala, Sunnyvale, CA (US); Ramani R. Routray, San Jose, CA (US); Sandeep M. Uttamchandani, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 505 days.

(21) Appl. No.: 12/567,582

(22) Filed: Sep. 25, 2009

(65) Prior Publication Data

US 2011/0078695 A1 Mar. 31, 2011

(51) Int. Cl.
*G06F 9/46* (2006.01)
*G06F 15/173* (2006.01)

(52) U.S. Cl. .......................... 718/104; 709/223
(58) Field of Classification Search .................... 718/104
See application file for complete search history.

(56) References Cited

U.S. PATENT DOCUMENTS

| | | | |
|---|---|---|---|
| 5,946,661 | A | 8/1999 | Rothschild et al. |
| 6,556,976 | B1 | 4/2003 | Callen |
| 6,609,113 | B1 | 8/2003 | O'Leary et al. |
| 6,735,701 | B1 * | 5/2004 | Jacobson ........................ 726/1 |
| 6,938,027 | B1 | 8/2005 | Barritz et al. |
| 6,999,943 | B1 | 2/2006 | Johnson et al. |
| 7,167,844 | B1 | 1/2007 | Leong et al. |
| 7,308,414 | B2 | 12/2007 | Parker et al. |
| 2002/0194045 | A1 | 12/2002 | Shay et al. |
| 2003/0050788 | A1 | 3/2003 | Cranner |
| 2003/0083912 | A1 | 5/2003 | Covington, III et al. |
| 2003/0158768 | A1 | 8/2003 | Maeda |
| 2004/0044551 | A1 | 3/2004 | Keefe et al. |
| 2009/0164356 | A1 * | 6/2009 | Bakman ........................ 705/34 |

OTHER PUBLICATIONS

Agarwala et al. "ChargeView: An Integrated Tool for Implementing Chargeback in IT systems", Network Operations and Mgmt. Symposium, Apr. 2008, pp. 371-378.*
Drury, D.H., "Conditions Affecting Chargeback Effectiveness," Information and Management, vol. 5, No. 1, North-Holland Publishing Company, Mar. 1982, pp. 31-36, New York, United States.
Gerlach et al., Determining the Cost of IT Services, Communications of the ACM, Sep. 2002, pp. 61-67, vol. 45, No. 9, ACM, New York, NY.

(Continued)

*Primary Examiner* — Jennifer To
*Assistant Examiner* — Wissam Rashid
(74) *Attorney, Agent, or Firm* — Kenneth L. Sherman, Esq.; Michael Zarrabian, Esq.; Sherman & Zarrabian LLP

(57) ABSTRACT

Reducing cost chargeback in an information technology (IT) computing environment including multiple resources, is provided. One implementation involves a process wherein resource usage and allocation statistics are stored for a multitude of resources and associated cost policies. Then, time-based usage patterns are determined for the resources from the statistics. A correlation of response time with resource usages and outstanding input/output instructions for the resources is determined. Based on usage patterns and the correlation, a multitude of potential cost reduction recommendations are determined. Further, a multitude of integrals are obtained based on the potential cost reduction recommendations, and a statistical integral is obtained based on the statistics. A difference between the statistical integral and each of the multiple integrals is obtained and compared with a threshold to determine potential final cost reduction recommendations. A final cost reduction recommendation is then selected from the potential cost reduction recommendations.

15 Claims, 6 Drawing Sheets

OTHER PUBLICATIONS

Tallon et al., "Information Life Cycle Management," Communications of the ACM, vol. 50, No. 11, Nov. 2007, pp. 65-69, ACM, New York, NY.

Hirschheim et al., "The Myths and Realities of Information Technology Insourcing," Communications of the ACM, vol. 43, No. 2, Feb. 2000, pp. 99-107, ACM, New York, NY.

Sridhar et al., A Contingency Model for Mapping Chargeback Systems to Information System Environments, Proceedings of the 1993 conference on Computer personnel research, 1993, pp. 206-213, ACM, New York, NY.

Ooi, G., et al., An Activity Based Costing Approach to Systems Development and Implementation, Int'l Conf. on Info Systems, 1998, pp. 341-345, Assoc. for Info Systems, Atlanta, GA.

EDP Analyzer, "The Effects of Charge-Back Policies," EDP Analyzer, vol. 11, No. 11, Nov. 1973, pp. 1-14, Canning Publications, Inc., USA.

D.H. Drury, "The Enigma of Chargeback Systems," Capacity Management Review, vol. 25, No. 1, Jan. 1997, pp. 1, 16-22, USA.

McKinnon et al., "Mapping Chargeback Systems to Organizational Environments," MIS Quarterly: Management Information Systems, vol. 11, No. 1, Mar. 1987, pp. 5-20, USA.

D.H. Drury, "Conditions Affecting Chargeback Effectiveness," Information and Management, vol. 5, No. 1, Mar. 1982, pp. 31-36, North Holland Publishing Company, New York.

Agarwala, S., et al., ChargeView: An Integrated Tool for Implementing Chargeback in IT Systems, Network Operations and Mgmt. Symposium, Apr. 2008, pp. 371-378, Salvador, Bahia.

O'Bryan, C., Online and Instructor-Led Technical Training: A Charge-Back Model that Works! SIGUCCS, Nov. 2005, pp. 266-269, ACM, New York, NY.

\* cited by examiner

CHARGEBACK REDUCTION PLANNING FOR INFORMATION TECHNOLOGY MANAGEMENT

BACKGROUND

1. Field of the Invention

The present invention relates generally to an information technology (IT) environment, and more in particularly, to reducing chargeback costs in an IT environment.

2. Background Information

With increasing automation of business processes within enterprises, the demand for information technology (IT) infrastructure is increasing exponentially, and is now a significant percentage of the total operating cost of a business. The capacity, performance, and availability demands of individual departments within each enterprise are being consolidated from isolated server-storage silos, to a unified virtualized environment of servers hosting multiple on-demand virtual machines, with transparent access to the entire storage subsystem using storage area networks (SANs). While such consolidation helps management, it poses challenges for Chief Information Officers (CIOs) responsible for containing IT costs and regulating usage of the infrastructure within departments. Chargeback is a process used to regulate IT costs by charging each department proportionally according to the resource allocated to it. This fosters efficient use of the available resources and also makes departments aware of their IT usage and associated costs.

A typical enterprise environment includes multiple departments, each utilizing custom IT applications and IT resource services. With the advancement of technologies such as virtualization and multi-core architectures, such IT custom applications and resource services are deployed in a shared and consolidated server-storage environment, typically managed by the enterprise IT department. Resource allocation for the applications is provided either by humans or resource planners. One example of resource allocation planner is TotalStorage Productivity Center (TPC) Storage Area Network (SAN) Planner. The allocation technique is dependent on the application Service Level Objectives (SLO), defined in terms of maximum latency, minimum throughput, etc. The allocation technique may also depend on quality attributes including no single point of failure, disaster recovery support, etc. Capacity planning involves utilizing automated tools to allocate a set of resources for a given set of SLOs. This is accomplished in two broad steps: first, the resources needed to achieve SLOs of each customer are determined using workload and device models (e.g., queuing theory model) and second, the resources are allocated from available resources using one of the many multi-dimensional bin packing algorithms. An IT department keeps track of the usage of these resources and depending on their usage allocates costs to each department in the form of a chargeback.

Depending on the chargeback policies, departments may be charged, whether or not they use the resources allocated to them. Although an IT department recovers total operating cost in the form of chargeback, enterprise as a whole may suffer due to the opportunity cost associated with the unused resources. System administrators or IT service providers while performing resource allocations attempt to achieve one or more of the following goals: satisfy customers SLOs, optimize the overall utilization of the resources, accommodate as many customers as possible, maximize profits and reduce operational costs. Because in general, IT customers and providers are conservative, and resources are over-provisioned to handle peak loads. This translates to misuse of resources and higher chargeback for customers.

BRIEF SUMMARY

Reducing cost chargeback in an information technology (IT) computing environment including multiple resources is provided. An embodiment involves a system including an input module configured to input network statistics for a plurality of system resources and a plurality of cost chargeback models. The system further includes an evaluation module configured to evaluate time-based resource usage based on the network statistics to result in at least one resource usage pattern. The system also includes a chargeback optimization module configured to determine cost reduction recommendations based on the at least one resource usage pattern and the plurality of cost chargeback models.

Another embodiment involves a process wherein resource usage and allocation statistics are stored for a multitude of resources and associated cost policies. Then, time-based usage patterns are determined for the resources from the statistics. A correlation of response time with resource usages and outstanding input/output transactions is determined. Based on usage patterns and the correlation, a multitude of potential cost reduction recommendations are determined. Further, a multitude of integrals are obtained based on the potential cost reduction recommendations, and a statistical integral is obtained based on the statistics. A difference between the statistical integral and each of the multiple integrals is obtained and compared with a threshold to determine potential final cost reduction recommendations. A final cost reduction recommendation is then selected from the potential cost reduction recommendations.

Yet another embodiment involves a computer program product for reducing cost chargeback in an IT computing environment including multiple resources. The computer program product comprises a computer usable medium including a computer readable program having program instructions. The computer readable program when executed on a computer causes the computer to perform the above process.

Other aspects and advantages of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

For a fuller understanding of the nature and advantages of the invention, as well as a preferred mode of use, reference should be made to the following detailed description read in conjunction with the accompanying drawings, in which.

DETAILED DESCRIPTION

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

The description may disclose several preferred embodiments for reducing cost chargeback in an information technology (IT) computing environment including multiple resources, as well as operation and/or component parts thereof. While the following description will be described in terms of chargeback optimization for clarity and to place the invention in context, it should be kept in mind that the teachings herein may have broad application to all types of systems, devices and applications.

Reducing cost chargeback in an information technology (IT) computing environment including multiple resources, is provided. One embodiment comprises a system for reducing cost chargeback in an information technology (IT) computing environment, the system including an input module configured to input network statistics for a plurality of system resources and a plurality of cost chargeback models. The system further includes an evaluation module configured to evaluate time-based resource usage based on the network statistics to result in at least one resource usage pattern. The system also includes a chargeback optimization module configured to determine cost reduction recommendations based on the at least one resource usage pattern and the plurality of cost chargeback models.

The system implements a process wherein resource usage and allocation statistics are stored for a multitude of resources and associated cost policies. Then, time-based usage patterns are determined for the resources from the network statistics. A correlation of response time with resource usages and outstanding input/output transactions is determined. Based on usage patterns and the correlation, a multitude of potential cost reduction recommendations are determined. Further, a multitude of integrals are obtained based on the potential cost reduction recommendations, and a statistical integral is obtained based on the statistics. A difference between the statistical integral and each of the multiple integrals is obtained and compared with a threshold to determine potential final cost reduction recommendations. A final cost reduction recommendation is then selected from the potential cost reduction recommendations.

Figure 1:
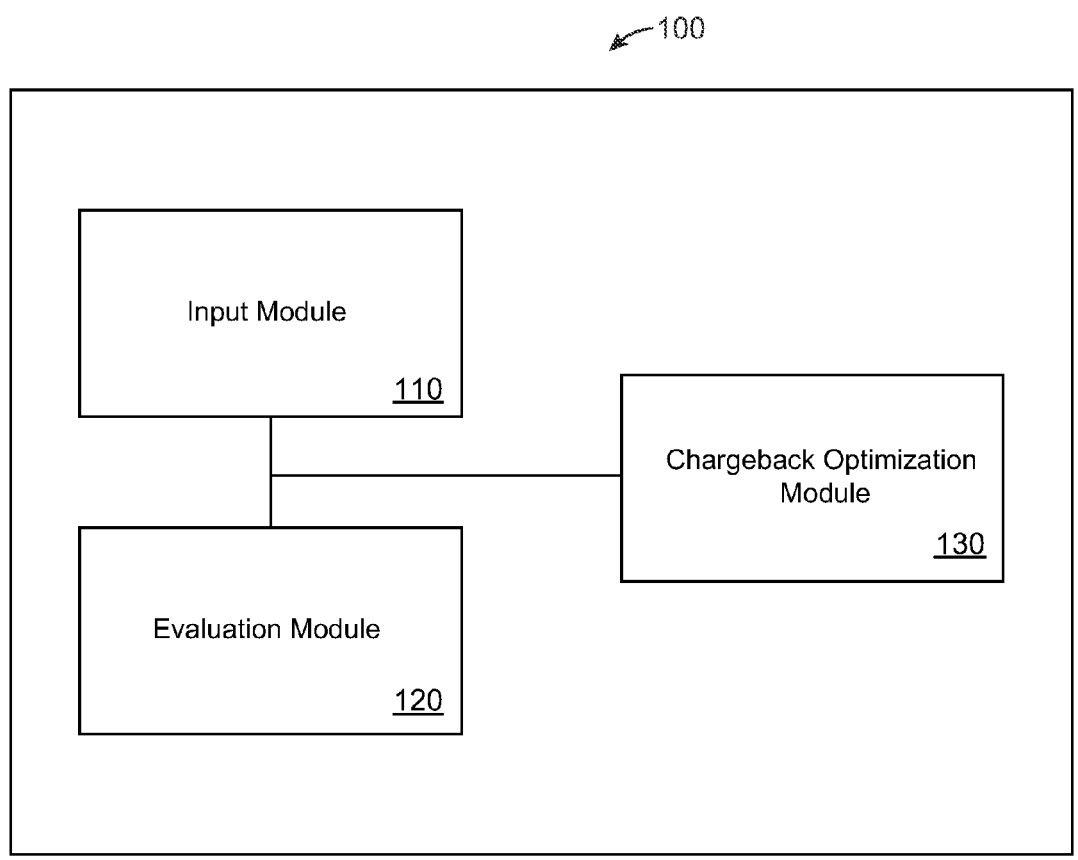
FIG. 1 illustrates a system for reducing cost chargeback in an IT computing environment including multiple resources, according to an embodiment of the invention.

FIG. 1 illustrates an example block diagram of a system for reducing cost chargeback in an information technology (IT) computing environment including multiple resources according to one embodiment of the invention. The system 100 includes an input module 110, an evaluation module 120 and a chargeback optimization module 130.

Figure 2:
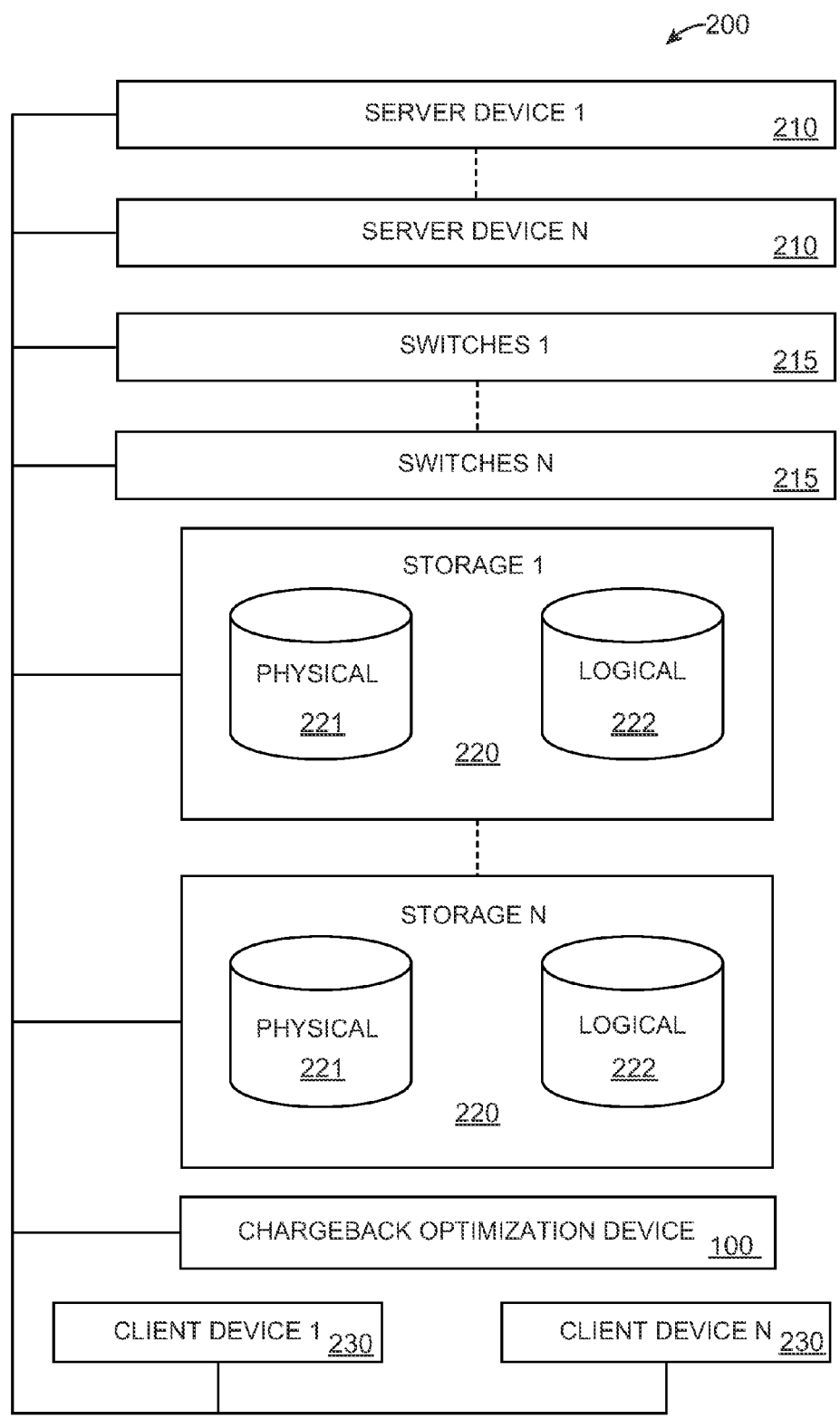
FIG. 2 illustrates an enterprise network including a system for reducing cost chargeback in an IT computing environment including multiple resources according to an embodiment of the invention.

FIG. 2 illustrates system 100 as part of an enterprise system 200 including server devices 1-N 210, switches 1-N 215, storage units 1-N 220 that include physical memory 221 and logical memory 222, and client devices 1-N 230. The system 100 functions as a cost-reduction planner for enterprise systems.

The system 100 analyzes the historic pattern of resource usage by different applications and recommends new allocation strategies that reduce the discrepancies between the actual usage and allocation. Time-varying SLOs define trends and seasonality of the resource workload (resource load), allowing adjustments to the allocation based on the application requirements, for reducing chargeback. The system 100 provides the ability to make changes in allocation and SLOs that allow meeting budget requirements of IT departments, and performing what-if analysis in evaluating cost savings for different SLOs and provisioning levels.

Figure 3:
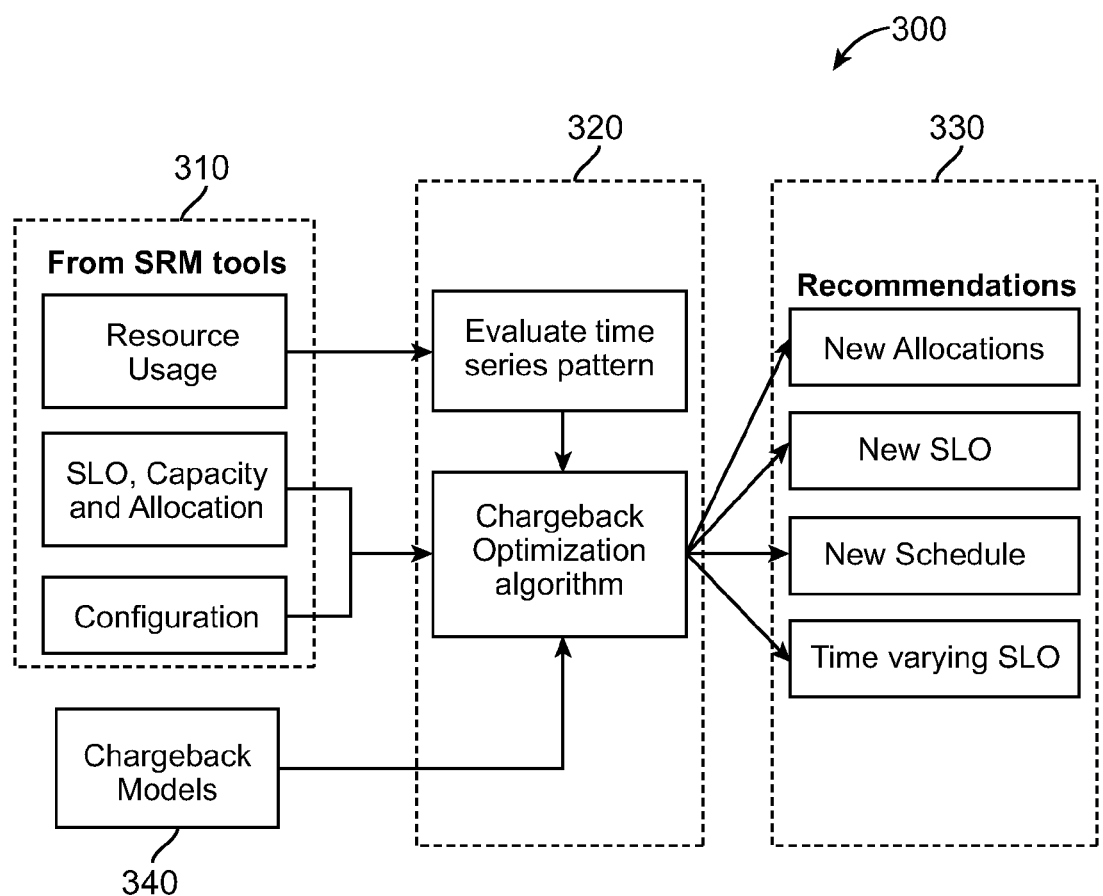
FIG. 3 illustrates inputs and outputs of a system for reducing cost chargeback in an IT computing environment including multiple resources, according to an embodiment of the invention.

FIG. 3 illustrates a process 300 for inputs and outputs of the system 100 in reducing cost chargeback in an IT computing environment including multiple resources according to an embodiment of the invention. The input module 110 inputs resource usage history data, Service Level Objectives (SLO), allocation data and resource configuration data. Specifically, in processing block 310, the input module 110 obtains information from Storage Resource Management (SRM) tools, including information about average resource usage, SLO, capacity, allocated resources, and configuration such as cost policy (for heterogeneous resources). The evaluation module 320 then analyzes the input information and provides strategies to reduce application chargeback, including: changing current allocation values, time-varying SLO and recommending a new allocation or SLOs.

In processing block 320 the evaluation module 120 evaluates time-series chargeback models 340 for performance usage data and utilizes a regression function to correlate response time with resource load and number of outstanding IOs. An interpolation is derived using white-box techniques or by applying known machine learning algorithms such as CART and M5. The evaluation module 120 uses positive-negative integral functions to optimize resource allocation that converges to the average application throughput. These integrals are defined as follows:

Positive Integral (A+): Area of curve above allocated value.
Negative Integral (A−): Area of curve in between average and allocated value.

The goal is to minimize the difference between allocated and average values, such as illustrated by relation (1) below:

$$\text{Min} \int_0^t A - \rightarrow \text{Allocated} \approx \text{Average} \qquad (1)$$

The chargeback optimization module 130 achieves optimization using an objective function such as illustrated by relation (2) below:

$$\text{Max} \sum_{j=0}^{devices} \sum_{i=0}^{workloads} A_{ij}^+ \times C_j \times SLO_i - \sum_{j=0}^{devices} \sum_{i=0}^{workloads} A_{ij}^- \times C_j \times SLO_i \qquad (2)$$

wherein
$A_{ij}$=Integral area of resource workload i at device j,
$C_j$=Cost rate for device j,
$SLO_i$=Operation zone of resource workload i.
The constraints on the above objective function are:
$latency_i$=SLO(resource workload$_i$),
$latency_i$=f(OutstandingIOS), and
OutstandingIOS=g(Load, $A_{ij}$).

Figure 4:
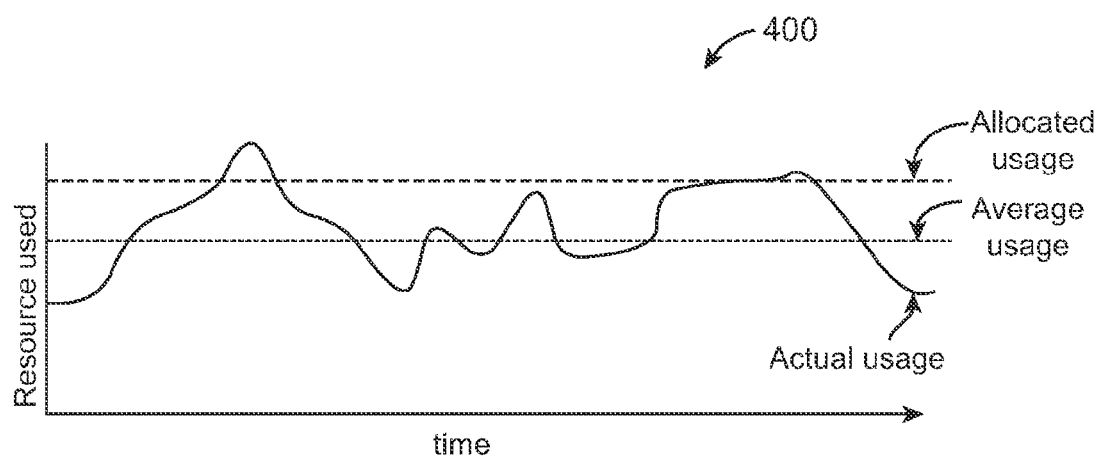
FIG. 4 illustrates a graph showing positive and negative integrals used for optimizing chargeback reduction.

FIG. 4 shows an example graph 400 illustrating positive and negative integrals used for optimizing chargeback reduction. The vertical axis represents the amount of resource used and the horizontal axis represents the time. The objective function determines SLOs and allocation that substantially optimizes (i.e., minimizes) chargeback for the resource workloads under consideration. The objective function utilizes non-linear optimization that interpolates the impact of allocation change on the application latency in relation to the SLO. The interpolation uses regression functions that quantify resource workload latency as a function of number of outstanding IOs.

Finally in the processing block 330 (FIG. 3), the system 100 provides recommendations including: new allocations, new SLOs, new schedule and time varying SLOs. The goal of these recommendations is to minimize the gap between the actual usage and the allocated resources, thereby reducing chargeback. The 'new allocation' strategy according to an embodiment of the invention recommends a change in the amount of resource allocation or a change in the type of resource allocated. For example, moving a workload from a very high-end server to a low-end server may satisfy its requirements as well as reduce chargeback. The 'new SLOs' strategy according to an embodiment of the invention recommend a change in the workload SLO. This is useful in scenarios where SLOs are incorrectly set to levels that are never attained and results in waste of resource and higher chargeback.

The 'time varying SLOs' strategy according to an embodiment of the invention recommends different allocation at different time of the day or at different month of the year. Typically, SLOs are defined such that they can handle all the peaks in the workloads. This results in over-provisioning of resources. Most workloads, however, consume different amount of resources at different point of operations. For example, some workloads may consume more resources during the day. Other workloads may consume more resources during holiday seasons, etc. The time-varying SLOs strategy according to an embodiment of the invention adapts the resource allocation according to the time varying nature of resource usage. The 'new schedule' strategy according to an embodiment of the invention defers workload processing to non-peak hours when the demand of IT resources is lower. For example, 'backup' jobs in a datacenter can be executed at night when the resource utilization is typically low.

Figure 5:
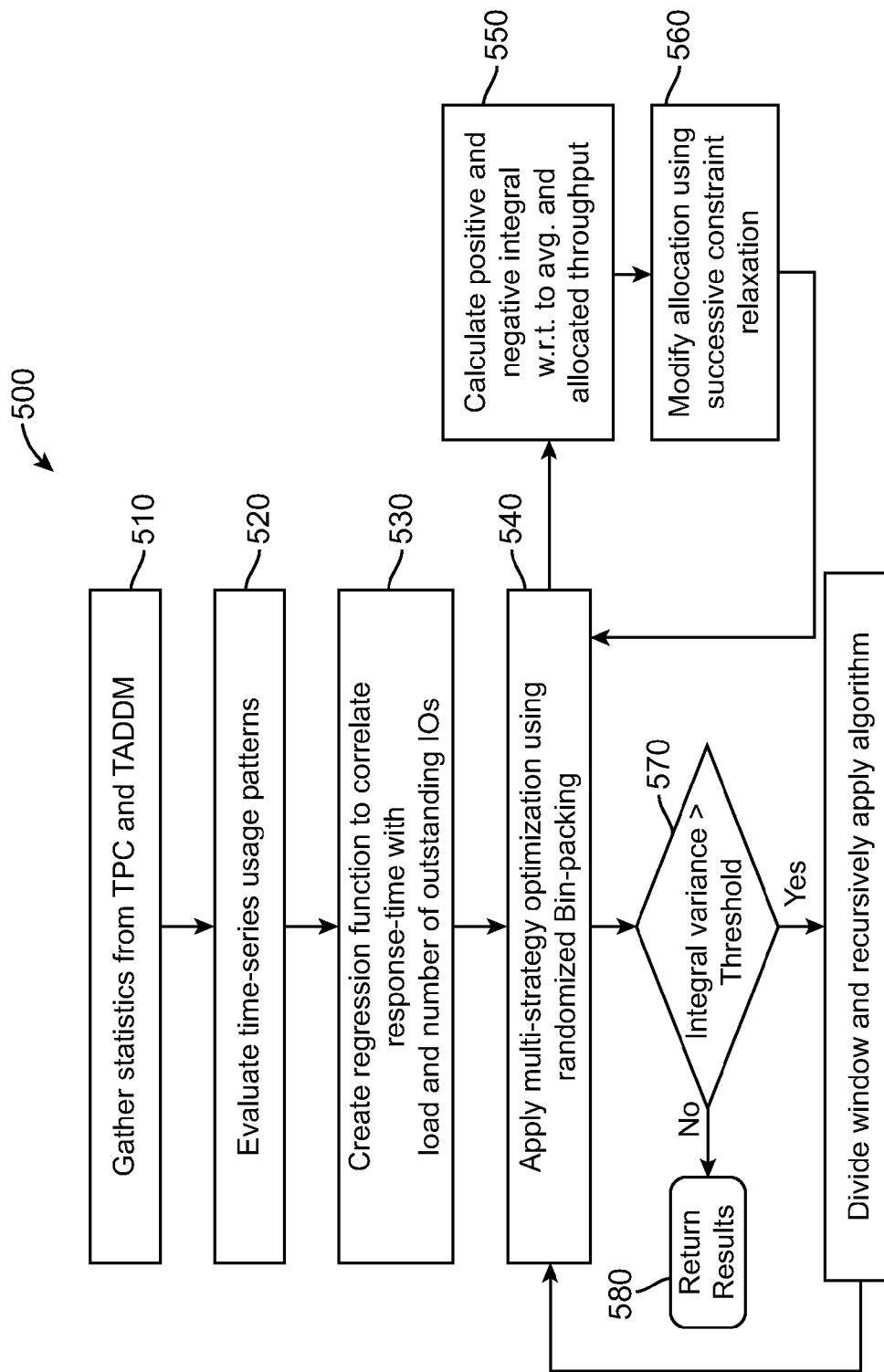
FIG. 5 illustrates a process for reducing cost chargeback in an IT computing environment including multiple resources, according to an embodiment of the invention.

FIG. 5 shows a more detailed process 500 for reducing cost chargeback by the system 100, according to an embodiment of the invention. In process block 510, resource usage and allocation statistics are gathered from resource management tools such as TotalStrorage Productivity Center (TPC) and Tivoli Application Dependency Discovery Manager (TADDM). In process block 520, time-series (time-based) usage patterns are evaluated for the plurality of resources from the statistics (e.g., calculating average, peak, median throughput). In process block 530, a regression function is generated to correlate response time with resource usages and outstanding input/output instructions for the plurality of resources. In one implementation, response time is correlated with resource workload and number of outstanding input/output operations (IOs). In process block 540, based on usage patterns and the correlation, a plurality of potential cost reduction recommendations is obtained. In one implementation, multi-strategy optimization is performed using randomized bin-packing.

Sub-processes of block 540 involve blocks 550 and 560, wherein in block 550, a plurality of integrals based on the plurality of potential cost reduction recommendations is determined, and a statistical integral based on the statistics is determined. In one implementation, positive and negative integrals are calculated in relation to averaged and allocated throughput.

The positive integrals may have values above a current resource allocation, and the negative integrals may have a value between an average resource allocation value and the current resource allocation value.

In block 560, the allocations are modified using successive constraint relaxation. Then, a difference between the statistical integral and each of the plurality of integrals is compared with a threshold to determine potential final cost reduction recommendations. Specifically, in process block 570 it is determined if the variance between the integrals is greater than a threshold. If not, then in block 580 results are returned. These results include one or more strategies (discussed in the previous paragraph.) Otherwise, in block 590 the historical time series usage window is divided into smaller intervals and recursively the process is repeated. Accordingly, a final cost reduction strategy (recommendation) is selected from the potential cost reduction strategies.

The final cost recommendation may comprise a time varying service level objective. The final cost recommendation may comprise one of a change of a current resource allocation value and a new resource allocation. The final cost reduction recommendation may comprise a new schedule for workload execution, or may define resource allocation that minimizes chargeback costs.

Figure 6:
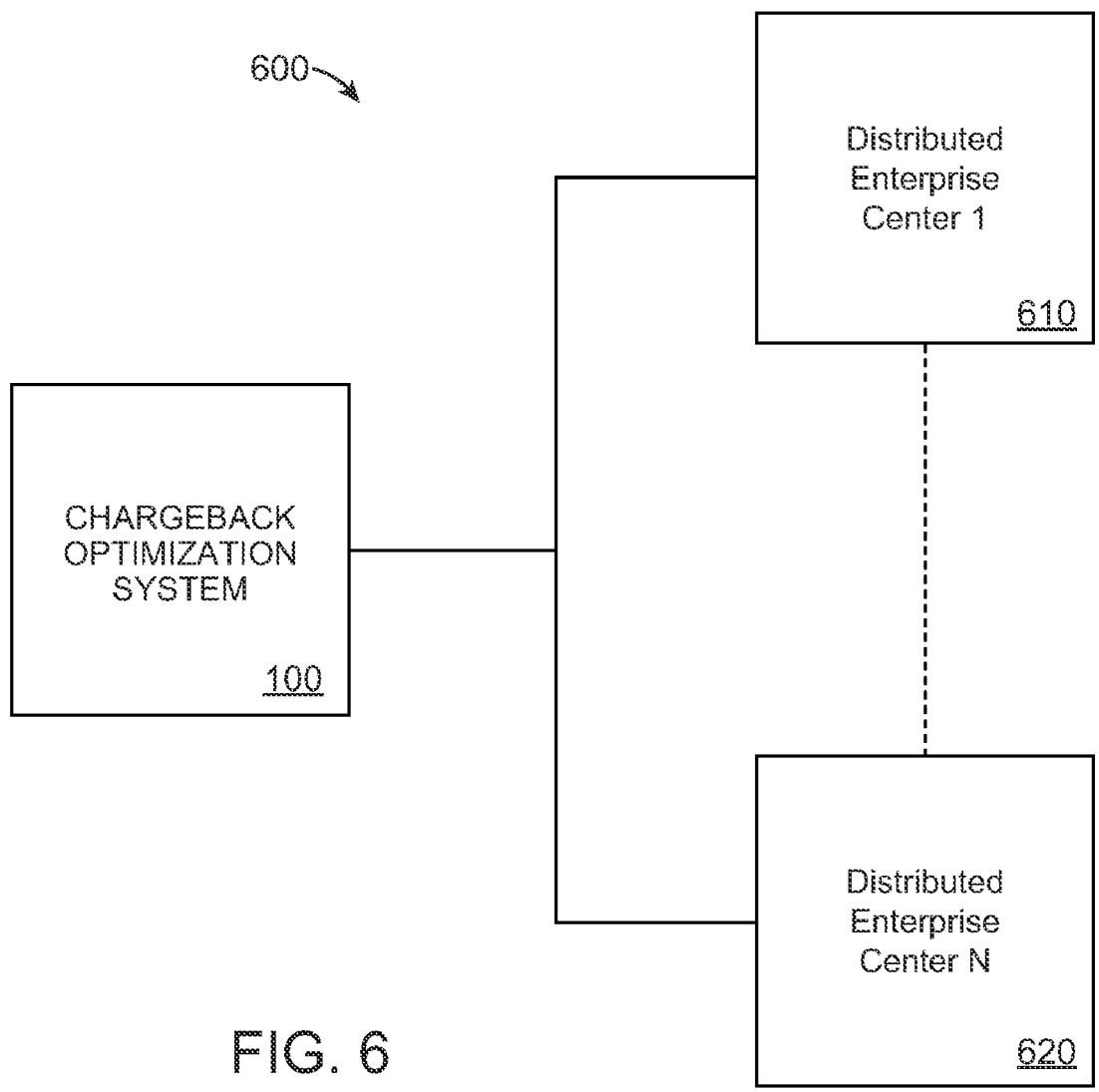
FIG. 6 illustrates a distributed system, according to an embodiment of the invention.

FIG. 6 illustrates a distributed system 600 according to one embodiment of the invention, comprising a distributed network including a plurality of distributed enterprise centers 610 1-N and the chargeback optimization system 100. In this embodiment, the distributed enterprise centers 610 each use the chargeback optimization system 100 for reducing cost chargeback as described herein.

The embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the embodiments of the invention can take the form of a computer program product accessible from a computer-usable or computer-readable medium providing program code for use by or in connection with a computer, processing device, or any instruction execution system. For the purposes of this description, a computer-usable or computer readable medium can be any apparatus that can contain, store, communicate, or transport the program for use by or in connection with the instruction execution system, apparatus, or device.

The medium can be electronic, magnetic, optical, or a semiconductor system (or apparatus or device). Examples of a computer-readable medium include, but are not limited to, a semiconductor or solid state memory, magnetic tape, a removable computer diskette, a RAM, a read-only memory (ROM), a rigid magnetic disk, an optical disk, etc. Current examples of optical disks include compact disk-read only memory (CD-ROM), compact disk-read/write (CD-R/W) and DVD.

I/O devices (including but not limited to keyboards, displays, pointing devices, etc.) can be connected to the system either directly or through intervening controllers. Network adapters may also be connected to the system to enable the data processing system to become connected to other data processing systems or remote printers or storage devices through intervening private or public networks. Modems, cable modem and Ethernet cards are just a few of the currently available types of network adapters.

In the description above, numerous specific details are set forth. However, it is understood that embodiments of the invention may be practiced without these specific details. For example, well-known equivalent components and elements may be substituted in place of those described herein, and similarly, well-known equivalent techniques may be substituted in place of the particular techniques disclosed. In other instances, well-known structures and techniques have not been shown in detail to avoid obscuring the understanding of this description.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method of reducing cost chargeback in an information technology computing environment including multiple resources, comprising:
   storing resource usage, allocation statistics for a plurality of resources and associated cost policies for the plurality of resources;
   determining time-based usage patterns for the plurality of resources from the allocation statistics;
   creating a correlation of response time with resource usages and outstanding input/output instructions for the plurality of resources;
   based on the time-based usage patterns and the correlation, obtaining a plurality of potential cost reduction recommendations;
   determining a plurality of integrals based on the plurality of potential cost reduction recommendations, and determining a statistical integral based on the allocation statistics;
   comparing a difference between the statistical integral and each of the plurality of integrals with a threshold to determine potential final cost reduction recommendations; and
   providing a final cost reduction recommendation selected from the potential cost reduction recommendations.

2. The method of claim 1, wherein the final cost reduction recommendation is a time varying service level objective.

3. The method of claim 1, wherein the final cost reduction recommendation is one of a change of a current resource allocation value and a new resource allocation.

4. The method of claim 1, wherein the plurality of integrals comprise positive integrals and negative integrals.

5. The method of claim 4, wherein the positive integrals have values above a current resource allocation, and the negative integrals have a value between an average resource allocation value and the current resource allocation value.

6. The method of claim 1, wherein the final cost reduction recommendation defines resource allocation that minimizes chargeback costs.

7. The method of claim 1, wherein the information technology computing environment comprises an enterprise system.

8. The method of claim 1, wherein the final cost reduction recommendation comprises a new schedule for workload execution.

9. A computer program product for reducing chargeback costs comprising a non-transitory computer usable medium including a computer readable program, wherein the computer readable program when executed on a computer causes the computer to:
   store resource usage, allocation statistics for a plurality of resources and associated cost policies for the plurality of resources;
   determine time-based usage patterns for the plurality of resources from the allocation statistics;
   create a correlation of response time with resource usages and outstanding input/output transactions for the plurality of resources;
   based on the time-based usage patterns and the correlation, obtain a plurality of potential cost reduction recommendations;
   obtain a plurality of integrals based on the plurality of potential cost reduction recommendations and an integral based on the allocation statistics;
   compare the difference between the integral based on the allocation statistics and each of the plurality of integrals with a threshold to determine potential final cost reduction recommendations; and
   provide a final cost reduction recommendation from the potential cost reduction recommendations.

10. The computer program product of claim 9, wherein the final cost reduction recommendation is a time varying service level objective.

11. The computer program product of claim 9, wherein the final cost reduction recommendation is one of a change of a current resource allocation value and a new resource allocation.

12. The computer program product of claim 9, wherein the plurality of integrals comprise positive integrals and negative integrals.

13. The computer program product of claim 12, wherein the positive integrals have values above a current resource allocation, and the negative integrals have a value between an average resource allocation value and the current resource allocation value.

14. The computer program product of claim 9, wherein the final cost reduction recommendation defines resource allocation that minimizes chargeback costs.

15. The computer program product of claim 9, wherein the information technology computing environment comprises an enterprise system.

* * * * *